United States Patent
Steeb et al.

(10) Patent No.: US 7,577,771 B2
(45) Date of Patent: Aug. 18, 2009

(54) CACHING DATA FOR OFFLINE DISPLAY AND NAVIGATION OF AUXILIARY INFORMATION

(75) Inventors: Curt A. Steeb, Redmond, WA (US); Andrew J. Fuller, Redmond, WA (US); Matthew P. Rhoten, Seattle, WA (US); Juan Perez, Seattle, WA (US); Stephen R. Drake, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 911 days.

(21) Appl. No.: 10/837,900

(22) Filed: May 3, 2004

(65) Prior Publication Data
US 2005/0243020 A1 Nov. 3, 2005

(51) Int. Cl.
G06F 3/00 (2006.01)
(52) U.S. Cl. .......................... 710/20; 715/234
(58) Field of Classification Search ............ 710/20; 715/234
See application file for complete search history.

(56) References Cited

U.S. PATENT DOCUMENTS

| | | | |
|---|---|---|---|
| 4,004,277 A | 1/1977 | Gavril | |
| 5,363,502 A | 11/1994 | Kagimasa | |
| 5,649,023 A * | 7/1997 | Barbara et al. | 382/159 |
| 5,745,105 A | 4/1998 | Kim | |
| 5,825,336 A | 10/1998 | Fujita | |
| 5,910,799 A | 6/1999 | Carpenter | |
| 5,960,214 A | 9/1999 | Sharpe | |
| 6,035,339 A | 3/2000 | Agraharam | |
| 6,096,096 A | 8/2000 | Murphy et al. | 717/11 |
| 6,191,758 B1 | 2/2001 | Lee | |
| 6,268,837 B1 | 7/2001 | Kobayashi | |
| 6,281,893 B1 | 8/2001 | Goldstein | |
| 6,327,482 B1 | 12/2001 | Miyashita | |
| 6,370,629 B1 | 4/2002 | Hastings | |
| 6,384,801 B1 | 5/2002 | Takahashi | |

(Continued)

FOREIGN PATENT DOCUMENTS

WO  WO01/75684  10/2001

OTHER PUBLICATIONS

Definition of "Driver", www.searchstorage.com, Nov. 9, 2003, http://searchstorage.techtarget.com/sDefinition/0,,sid5_gci212002,00.html, Accessed Jul. 13, 2007.

(Continued)

Primary Examiner—Alford W Kindred
Assistant Examiner—Chun-Kuan Lee
(74) Attorney, Agent, or Firm—Workman Nydegger

(57) ABSTRACT

Described is a system and system by which application programs provide data to auxiliary display device (that is associated with a main computer system) for display, including at times when the main computer system is powered down. The cache maintains the user data in association with structured navigational information, to allow navigation within the data via the structure. When online, the main computer system prepares the data cache from program data in combination with navigational information, and transfers the cache to an offline medium such as auxiliary storage in firmware. The cache may be arranged as a tree structure, such that navigation commands result in output according to data in the tree. Other events such as time-based events can change the auxiliary device output.

24 Claims, 9 Drawing Sheets

U.S. PATENT DOCUMENTS

| | | | |
|---|---|---|---|
| 6,415,418 B1 | 7/2002 | McLaughlin | |
| 6,438,577 B1 | 8/2002 | Owens | |
| 6,694,389 B2 * | 2/2004 | Coates et al. | 710/52 |
| 6,750,830 B1 | 6/2004 | Teshima | |
| 6,944,818 B2 | 9/2005 | Newman | |
| 6,947,772 B2 | 9/2005 | Minear | |
| 6,989,801 B2 | 1/2006 | Bruning | |
| 7,024,415 B1 * | 4/2006 | Kreiner et al. | 707/101 |
| 7,030,837 B1 | 4/2006 | Vong | |
| 7,047,339 B2 * | 5/2006 | Oakley | 710/303 |
| 7,051,196 B2 | 5/2006 | Angelo | |
| 7,092,943 B2 | 8/2006 | Roese | |
| 7,123,212 B2 | 10/2006 | Acharya | |
| 7,136,676 B2 | 11/2006 | Lee | |
| 7,152,171 B2 | 12/2006 | Chandley | |
| 7,155,253 B2 | 12/2006 | Sawayama | |
| 7,187,951 B2 | 3/2007 | Kaida | |
| 7,221,331 B2 | 5/2007 | Bear | |
| 7,225,410 B2 | 5/2007 | Kimmo | |
| 7,231,529 B2 | 6/2007 | Park | |
| 7,240,228 B2 | 7/2007 | Bear | |
| 7,249,323 B2 | 7/2007 | Ageta | |
| 7,286,112 B2 | 10/2007 | Kinjo | |
| 7,356,570 B1 * | 4/2008 | Tuli | 709/217 |
| 7,356,706 B2 | 4/2008 | Scheurich | |
| 2001/0007140 A1 | 7/2001 | Landry et al. | |
| 2001/0028366 A1 | 10/2001 | Ohki | |
| 2002/0129006 A1 * | 9/2002 | Emmett et al. | 707/1 |
| 2002/0133601 A1 | 9/2002 | Kennamer | |
| 2003/0006942 A1 | 1/2003 | Searls | |
| 2003/0043110 A1 | 3/2003 | Chaves | |
| 2003/0115415 A1 | 6/2003 | Want | |
| 2003/0154492 A1 | 8/2003 | Falvo | |
| 2003/0156074 A1 | 8/2003 | Ranganathan et al. | |
| 2004/0233930 A1 | 11/2004 | Colby | |
| 2005/0005001 A1 | 1/2005 | Hara | |
| 2005/0066089 A1 | 3/2005 | Karaoguz | |
| 2005/0073471 A1 | 4/2005 | Selbrede | |
| 2005/0192922 A1 | 9/2005 | Edlund | |
| 2006/0194549 A1 | 8/2006 | Janik | |

OTHER PUBLICATIONS

Office Action dated Feb. 28, 2008 cited in related U.S. Appl. No. 10/837,895 (Copy Attached).
Office Action dated Jul. 26, 2007 cited in related U.S. Appl. No. 10/838,174 (Copy Attached).
Office Action dated Jan. 28, 2008 cited in related U.S. App. No. 10/838,174 (Copy Attached).
Office Action dated Aug. 14, 2007 cited in related U.S. Appl. No. 10/837,894 (Copy Attached).
Office Action dated Dec. 27, 2007 cited in related U.S. Appl. No. 10/837,894 (Copy Attached).
Office Action dated May 21, 2008 cited in related Application No. 10/838,174 (Copy Attached).
Office Action dated Nov. 12, 2008 cited in related U.S. Appl. No. 10/838,174 (Copy Attached).
Office Action dated Dec. 1, 2008 cited in related U.S. Appl. No. 10/837,895 (Copy Attached).

* cited by examiner

CACHING DATA FOR OFFLINE DISPLAY AND NAVIGATION OF AUXILIARY INFORMATION

CROSS REFERENCE TO RELATED APPLICATIONS

The present invention is related to the following copending United States Patent Applications filed concurrently herewith, assigned to the assignee of the present invention, and hereby incorporated by reference in their entireties:

"Processing Information Received at an Auxiliary Computing Device," U.S. patent application Ser. No. 10/837,895, filed May 3, 2004;

"Context-Aware Auxiliary Display Platform and Applications," U.S. patent application Ser. No. 10/837,894, filed May 3, 2004; and "Auxiliary Display System Architecture," U.S. patent application Ser. No. 10/838,174, filed May 3, 2004.

FIELD OF THE INVENTION

The invention relates generally to computer systems, and more particularly to an improved system and system for display of information for a computing device.

BACKGROUND OF THE INVENTION

Laptops and other mobile devices allow the user to work in various locations, providing great convenience to users. However, the mobile devices are often powered down when traveling between locations, particularly with laptops in which the lid is typically closed during transit. As a result, access to relevant data on the device requires opening the laptop lid, waiting for power-up, and navigating to the desired information. This is a time-consuming and less-than-desirable user experience, particularly when the desired data is something as simple as a room number of a meeting.

U.S. patent application Ser. Nos. 10/429,930 and 10/429,932 are generally directed towards the concept of computer systems having auxiliary processing and auxiliary mechanisms, particularly display-related mechanisms, that provide some computing functionality. For example, a small LCD on the lid or side of a laptop computer can provide its owner with useful information, such as a meeting location and time.

However, such auxiliary displays have heretofore been limited to narrow, limited operations in which a dedicated auxiliary display program is customized with respect to the information that can be displayed. For example, if meeting information was desired, the user would only see the information if the auxiliary display program was programmed to display the particular type of data as well programmed with the relevant data for the current meeting.

What is needed is a way for application programs that run under the main operating system of a computer system to provide appropriate data for display and navigation on an auxiliary display of that computer system, including at times when the main display is not easily accessible, such as when the computer system is powered down.

SUMMARY OF THE INVENTION

Briefly, the present invention provides a cache of relevant user application program data that allows a user to navigate through the information via an auxiliary display and associated actuators that remain active while the main computer system is powered down (offline). The cache maintains the user data in association with structured navigational information, whereby the user can navigate within the data via the structure. The structured cache provides a flexible mechanism that does not limit the user to the type of data that can be cached.

To accomplish offline operation, when online the main CPU, operating system and application programs prepare a data cache and other information that is then transferred to auxiliary storage in the firmware for use offline. The transfer may be a full transfer of the cache at transition to the powered-down state, or may be a synchronization of previously-cached data. The auxiliary device may be attached to the computer system, or the cache may be made available for remote access by another device, in which event the cache is the entity that couples the other device to the main computer data, essentially making the other device an auxiliary display.

A layered architecture is provided, by which application programs and the like (e.g., operating system components) register to provide data for auxiliary display to an auxiliary device service layer. Among other operations, the service layer is configured to structure the data into a cache. The structure may correspond to user navigation, such that navigation commands received from the user walk the user through the structure. For example, each application program that provides data can be represented by a branch of a tree structure, with child nodes under each branch providing some further navigation paths and/or some subset of the application's data. Note that in addition to offline navigation, the cache can be used for online navigation, although for efficiency and for purposes of staying up-to-date, when online, some of the data in the cache can be a reference pointer to data in the main system rather than the actual data. Note further that if used, the online cache does not necessarily provide the same data as the offline cache, e.g., a user may want different application programs when online from when offline, and some of the application programs' data may have to be pruned when offline due to storage space limitations in the firmware.

In one implementation, the cache is arranged as a tree structure, such that only up and down navigation commands are required to navigate the tree, along with a selection mechanism (e.g., a selection button or button combination/actuation pattern) to make a selection. A home page is maintained in the firmware, and at a minimum provides a way to get to the application program's or programs' data. For example, if the cache is a tree structure, the home page is a root node in the tree and may provide a (scrollable) list of the application programs that are represented by nodes branching directly from the root/home page node.

As a user navigates the tree, the output of the auxiliary device may change, such as by sending a new cached bitmap to the display, or rendering a new display by interpreting cached markup data or the like. The user thus obtains an offline experience that presents various display screens for viewing the cached application program data.

In addition to program data, the firmware can also contain time-based event data or other event-based data such as power-state based events. For example, with time based events, the firmware can set up time-triggered interrupts that fire an event. When such an event is received, the firmware determines what the event means, and may change the state of the auxiliary device in response to the event, e.g., to show a cached meeting reminder, light an indicator or perform some other programmed action.

Other advantages will become apparent from the following detailed description when taken in conjunction with the drawings, in which:

DETAILED DESCRIPTION

Exemplary Operating Environment

Figure 1:
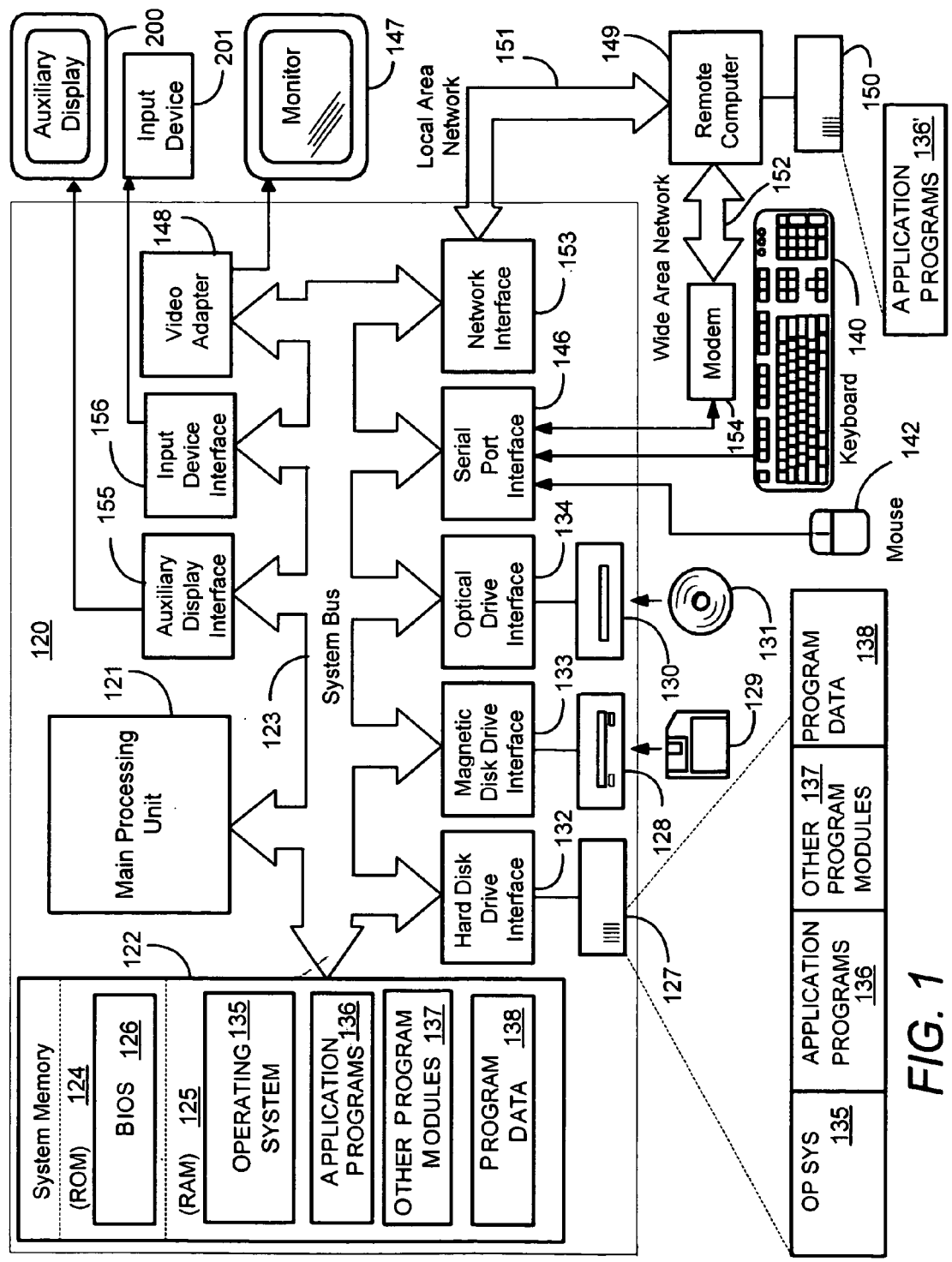
FIG. 1 is a block diagram representing a general purpose computing device in the form of a conventional personal computer system into which the present invention may be incorporated.

FIG. 1 is a block diagram representing a computing device 120 in the form of a personal computer system into which the present invention may be incorporated. Those skilled in the art will appreciate that the personal computer system 120 depicted in FIG. 1 is intended to be merely illustrative and that the present invention may be practiced with other computer system configurations, including hand-held devices, multiprocessor systems, microprocessor-based or programmable consumer electronics, network PCs, minicomputers, mainframe computers, headless servers and the like. The invention may also be practiced in distributed computing environments where tasks are performed by remote processing devices that are linked through a communications network. In a distributed computing environment, program modules may be located in both local and remote memory storage devices.

The personal computer system 120 included a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124. The personal computer 120 may further include a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120. Although the exemplary computer system described herein employs a hard disk, a removable magnetic disk 129 and a removable optical disk 131, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary computer system.

A number of program modules may be stored on the hard disk, magnetic disk 129, optical disk 131, ROM 124 or RAM 125, including an operating system 135 (such as Windows® XP), one or more application programs 136 (such as Microsoft® Outlook), other program modules 137 and program data 138. A user may enter commands and information into the personal computer 120 through input devices such as a keyboard 140 and pointing device 142. Other input devices (not shown) may include a microphone, joystick, game pad, satellite dish, scanner or the like. These and other input devices are often connected to the processing unit 121 through a serial port interface 146 that is coupled to the system bus, but may be connected by other interfaces, such as a parallel port, game port or universal serial bus (USB). A monitor 147 or other type of display device is also connected to the system bus 123 via an interface, such as a video adapter 148. In addition to the monitor 147, personal computers typically include other peripheral output devices (not shown), such as speakers and printers. An auxiliary display 200 is an additional output device, and may, for example, be connected to the system bus 123 via an auxiliary display interface 155. An auxiliary display 101 may also connect to a computing device 20 through a serial interface or by other interfaces, such as a parallel port, game port, infrared or wireless connection, universal serial bus (USB) or other peripheral device connection. An input device 201 in FIG. 1 may provide one or more actuators to interface with and/or control the auxiliary display 200, and for example may be connected to the system bus 123 via input device interface 156, which may be a serial interface, or by other interfaces, such as a parallel port, game port, infrared or wireless connection, universal serial bus (USB) or other peripheral device connection.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, Intranets and the Internet.

When used in a LAN networking environment, the personal computer 120 is connected to the local network 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

It should be noted that the computer system need not be fully operational for an auxiliary display to work in accordance with the present invention. Indeed, as described below with reference to FIG. 6, an auxiliary display may still work when the computer is powered down, at least to a default extent or to an extent configured by a user, such as when the computer system is in a sleep state or a hibernate mode, and/or when the user has not yet logged on or is otherwise locked out of the system via security mechanisms. For example, the user may want a telephone handset and speakerphone that are integrated into a personal computer to work as conventional appliances when the computer system is powered down, and use the auxiliary display as a caller-ID device. This device may also store data for later transmission to the computer system when the computer system is again powered up, such as to log the calls received, including when the computer system was not fully powered up.

The auxiliary display may supplement the main display and may also serve as a surrogate display when the main display is shut down or otherwise not operational (e.g., disconnected), to give the user some information. For example, information such as how to power up the main display might be helpful, as would a room number and/or directions to a meeting on an auxiliary display device connected to a mobile computer that the user can view when the main display is off and/or not easily visible (e.g., the lid of a laptop is closed). Note that even on a tablet PC with a continually visible screen, the main display may be shut down to save power, whereby an auxiliary display may provide substantial benefits. Note that the user may limit the extent of the display based on the computer system state, e.g., when the user is not logged in, only certain non-sensitive or very specifically-controlled information may be displayed, and so forth.

To enable and control communication in these powered-down modes, firmware may exist, stored in non-volatile memory, that when loaded and operated on by a secondary processor, enables the auxiliary display, along with other auxiliary components to be used, as long as some power is available. Note that as used herein, the term "firmware" can be generally considered as representing the auxiliary memory, the code therein and/or the secondary processor on which it runs.

Figure 2A:
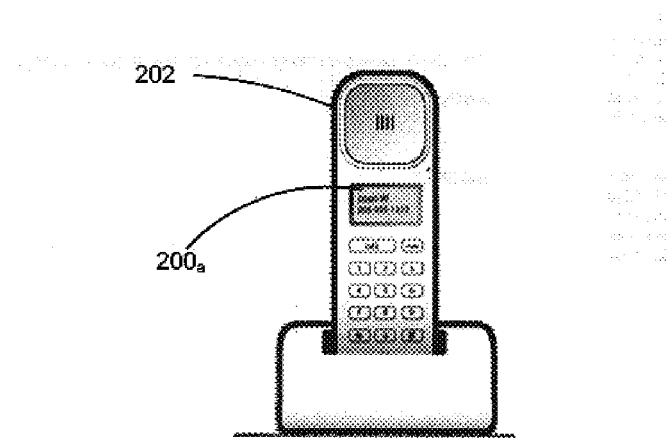
FIGS. 2A-2E are exemplary illustrations generally representing locations for placement of the auxiliary display on various devices.
Figure 2B:
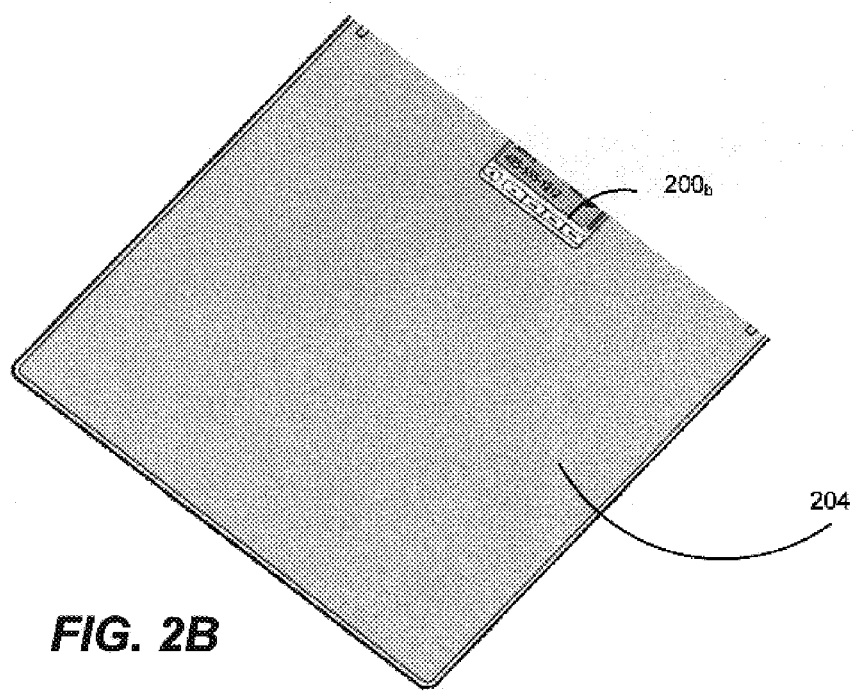
Figure 2C:
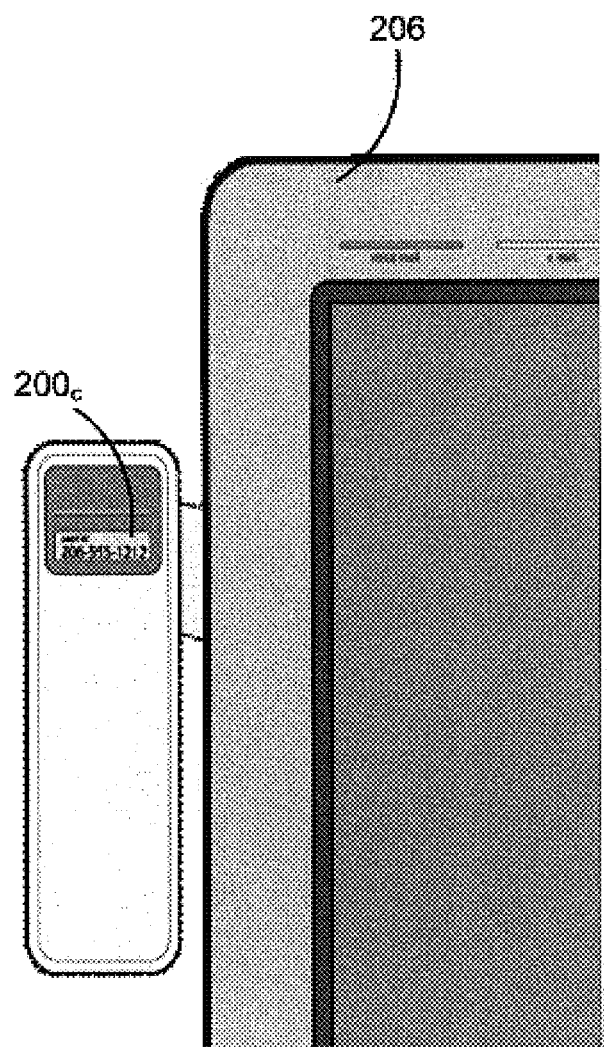
Figure 2D:
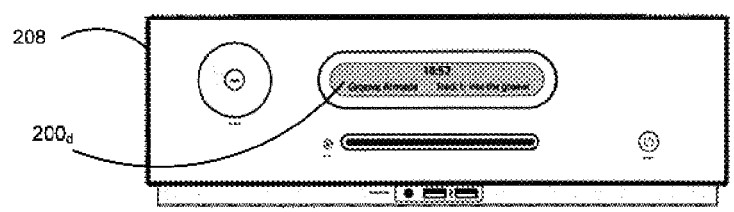
Figure 2E:
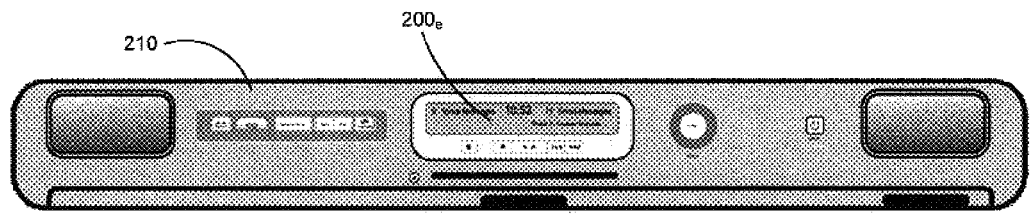
Figure 2E:
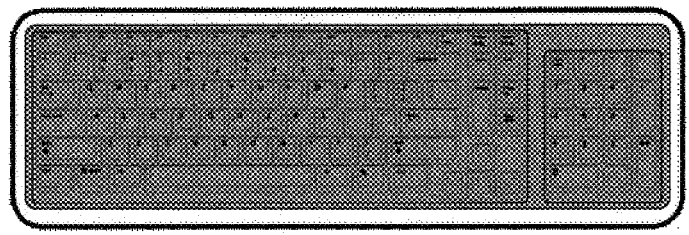
Figure 2E:
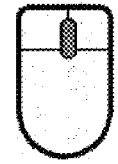

FIGS. 2A-2E illustrate exemplary locations on or associated with computing devices for placement of auxiliary display screens $200_a$-$200_e$, respectively. As represented in FIGS. 2A and 2B, an auxiliary display screen $200_a$ may be placed on the front, back or other surface of a standalone (landline or mobile) phone 202, (which need not be physically coupled if otherwise linked such as via Bluetooth technology) and/or another auxiliary display screen $200_b$ placed on the edge or lid of a mobile computer 204 or tablet computing device (not shown). Another place for an auxiliary display screen $200_c$ (FIG. 2C) may be on a phone mounted on a computer or a peripheral device attached to a computer such as on monitor 206 or on a keyboard (not shown). FIGS. 2D and 2E illustrate additional placements of auxiliary display screens $200_d$ and $200_e$ on the front panel of a standalone console 208 connected to a computer, or some other housing 210 (such as a housing for the motherboard), respectively. Those skilled in the art will appreciate that an auxiliary display screen may be placed on any surface of any computing device or other device having display capabilities, such as placed on a watch with a wireless or other connection to a computer, on a remote control device, on a remote wall-mounted unit, and so forth.

As should be apparent from FIGS. 2A-2E, an auxiliary display may be in the form of any number of known types of displays such as one or more LEDs, a 2-line alphanumeric display, a monochrome display, or a color display. Those skilled in the art will appreciate that the present invention may also use the display of other computing or communication devices as the auxiliary display 200. These other computing or communication devices include general purpose computers, cell phones, and handheld devices such as a pager or a personal digital assistant (PDA). Additionally, the present invention may use a virtual auxiliary display implemented within an area of the onscreen display of the computing device 120 (e.g. a screensaver or a component of the graphical user interface) as the auxiliary display 200, including before a user has logged in. The auxiliary display 200 may include a combination of any of the forms described above, and also be physically or logically combined with indicators such as one or more LEDs and/or used in conjunction with a virtual auxiliary display.

Even absent a screen, one or more LEDs may be advantageously used as the auxiliary display 200 for notification about the occurrence of an activity. Such an auxiliary display may be implemented with low costs and less power consumption and provide notification in an unobtrusive manner. It may be effective used for systems with extremely tight form factors or for systems where communications for users are managed by another person. An auxiliary display 200 may additionally be effective when notifications need to be seen from, a distance. An auxiliary display also may be used in conjunction with an onscreen virtual auxiliary display when there is informational content associated with the activity, such as notification of a new email message. In this case, content from the email may also be displayed on the virtual auxiliary display 200. Furthermore, an auxiliary display 200 may be effectively used for public systems (libraries or kiosks) or shared computers when display of content is undesirable.

Alternatively, a 2-line alphanumeric display may be advantageously used as the auxiliary display 200 where cost or space is critical, but notifications and basic content are desired. It may be effectively used for tablet PCs, laptops, budget PCs, phone docking stations, monitor bezels, and small or low-cost PC appliances or peripherals such as a handset, keyboard, or remote control. It may also be effectively used as a replacement for (and an improvement to) a caller ID box.

Furthermore, a monochrome or color multi-line display may be advantageously used as the auxiliary display 200 for media-rich applications, high-end consumer systems or media center systems. It may be effectively used for high-end laptops with more generous form factors or where an emphasis is placed on communication, full-function PCs with a heavy business or communications emphasis, media centers or high-end media appliances (including remotes, console systems with portable media functionality) and mobile auxiliary displays. Additionally, the display of another computing or communication device may advantageously be used as the auxiliary display 200 where users can expand the role of these supplemental devices when using their PC. These other computing or communication devices include general purpose computers, cell phones, and handheld devices such as a pager or a personal digital assistant (PDA). Further, note that the auxiliary display need not be an actual display, but can be a projection (e.g., onto a wall) of the information. An auxiliary display, as referred to herein, may be composed of essentially anything that can be sensed, including any visual, audible, and/or tactile representations.

As mentioned previously, a virtual auxiliary display may be used as the auxiliary display 200 for public systems (libraries or kiosks) or shared computers when display of content is undesirable. It may also be effectively used for low-cost systems or for devices with very minimal form factors that make even LEDs impractical. A virtual auxiliary display may be implemented as a screensaver or as a component of the graphical user interface.

The input device 201, hereinafter referred to as actuators (in plural, even if only a single mechanism such as a button or pointing device), provides the user with a mechanism to switch between different categories of application data or notifications such as email notifications, voicemail notifications, calendar notifications, system status notifications, caller ID lists and other types of notification messages. Accompanying such a switch button may also be an up button and a down button to allow the user to scroll forward and backward through the notification messages within a particular category. Those skilled in the art will appreciate that any other types of actuators may be used, such as a keyboard, microphone, joystick, game pad or other device including a device that contains a biometric sensor, environmental sensor, position sensor, or other type of sensor. Any of the input devices of the computing device 120 that is represented in FIG. 1 may be used as the input device (actuators) 201, and may be used in conjunction with independent actuators.

Caching for Offline Auxiliary Display Operation

As will be understood, the present invention provides an auxiliary display 200 for a user to simply and rapidly view auxiliary information. In keeping with the present invention, the user may select, to an extent, what information appears on the auxiliary display by using actuators 201 to select among application program data that can be presented on the auxiliary device. Although program data and event notifications will be used to illustrate the auxiliary display of information, it should be understood that the present invention may provide auxiliary display of other types of information, such as data from Internet-related services including transaction services, auction services, advertising services, entertainment services, and location services. Such services can provide a wide variety of information including financial transaction information, headline news, stock quotes, sport scores, weather and other information, including information specifically requested by the user as well as unsolicited information. It will also be appreciated that the auxiliary display 201 may be operative using any number of known types of displays such as a set of notification lights, a 2-line alphanumeric display, a monochrome display, or a color display. Note that as used herein, for simplicity "auxiliary display device" will generally refer to the auxiliary display screen and/or the actuators associated with that screen as well as any other hardware, firmware or software in the device, however it should be understood that the screen and actuators may be independent mechanisms, and/or that there may not be actuators requiring physical contact to input data. Further, note that the auxiliary display device may be considered as possibly containing indicators (e.g., individual LEDs) instead of or in addition to a pixel-type display screen.

In accordance with an aspect of the present invention, the present invention facilitates usage of the auxiliary display at times when the main CPU/operating system and application programs are not operating, that is, when the system is offline, but the auxiliary device remains operational. Note that the offline auxiliary system components are implemented in firmware including an auxiliary processor and auxiliary memory containing executable code and data. To accomplish offline operation, when online the main CPU/operating system and application programs prepare a data cache and other information, that is then transferred to auxiliary storage in the firmware for use offline.

The transfer may be a full transfer of the cache at power-down (e.g., shutdown/sleep/hibernate time), or may be performed in part by a background process or the like such that only synchronization (instead of a full data transfer) is required at power-down time. Moreover, a computer device such as a desktop may not go into a powered-down state to make such a cache accessible. For example, via a background process or a manually-initiated operation, the cache can be built. If the cache is remotely accessible, the user would have remote access to the cached auxiliary information and the transfer can occur to a remote device without the computer device needing to be powered down. Thus, consider a user that travels to a meeting without a computer, but has another device such as a SmartPhone configured to remotely access the cache data of the main computer. Because of the cache, such a remote user can remotely view and navigate the cache via the remote device, which because of the cache is an auxiliary display of the system.

Figure 3:
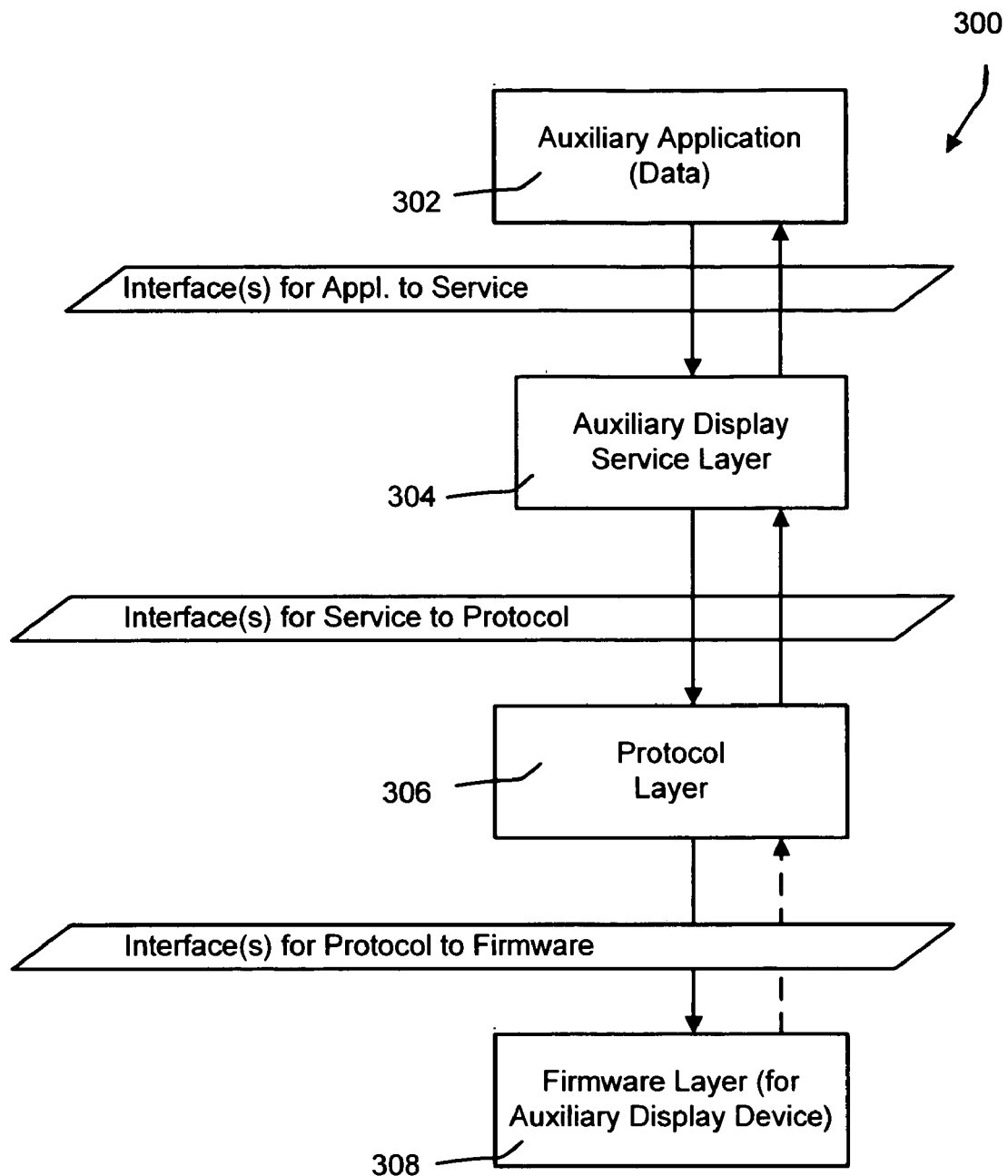
FIG. 3 is a block diagram generally representing a layered architecture by which application programs can exchange data with the firmware of an arbitrary auxiliary display device in accordance with an aspect of the present invention.

As generally represented in FIG. 3, there is provided a layered architecture by which one or more application programs 302 can interface with virtually any type of auxiliary display device, to output data to its display 200 and/or interact with the user via actuators 201. To this end, there is provided an architecture having independent architectural layers of software, as generally described in the aforementioned related U.S. patent application entitled "Auxiliary Display System Architecture." Note that in this related U.S. patent application, the layers are shown in generally the same order as in FIG. 3, although the grouping of components which is somewhat arbitrary may slightly differ from FIG. 3 of the present application. In any event, in FIG. 3, the service can be considered as an independent layer 304, with the application layer 302 above the service layer 304 and with the protocol layer 306 below the service layer 304.

In the implementation represented in FIG. 3, four layers are present, each separated by interfaces. More particularly, in addition to the application layer 302, the service layer 304, and the protocol layer 306, there is a firmware layer 308 shown in FIG. 3. As described below, these layers provide a straightforward mechanism by which an application program may provide auxiliary data for caching in a structured manner that provides a user with easy access to relevant cached information, without having to power the computer (and/or open it to see the main display screen, if a laptop or covered tablet).

Figure 4:
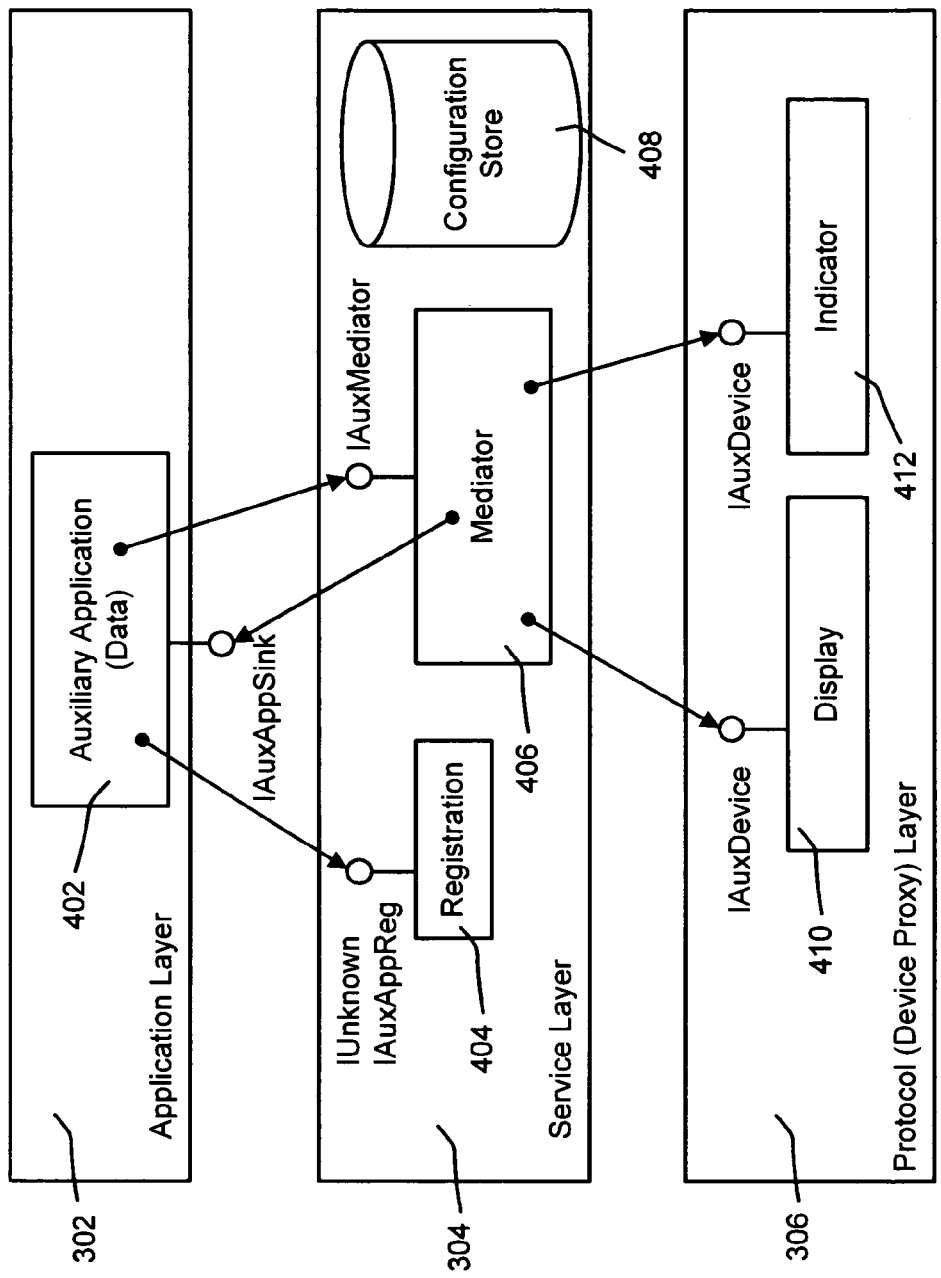
FIG. 4 is a representation of how in one implementation, an auxiliary-aware application program interfaces with the auxiliary display service to exchange data with an auxiliary display device, in accordance with an aspect of the present invention.

FIG. 4 shows some of the layers and various interfaces in more detail. In general, the application layer 302 provides the managed and native interfaces as application programming interfaces (APIs), which as described below, facilitates the creation of a structured cache, e.g., in a tree format or other suitable structure. One goal of the application layer 302 is to provide an abstraction to the details of the structured cache so that the application programs need only provide the data rather than fit it to a particular structure.

The application layer 302 provides the interfaces for developers to build solutions while the service layer addresses certain aspects of presenting auxiliary information, namely arbitration, interruption, and cache creation. Arbitration (as generally described in the aforementioned related U.S. patent application entitled "Auxiliary Display System Architecture) and interruption support provides a framework that enables sharing of auxiliary resources.

In accordance with an aspect of the present invention, cache creation is the mechanism that structures the application data for an offline experience. As described below with reference to FIG. 5, the service layer builds the cache in a manner that preserves context and structure information so that the firmware can navigate the data when completely isolated from the online operating state. As further described below, in one implementation, the service layer is also responsible for pruning the data structure in the event that its content size exceeds the allotted storage capacity of the auxiliary device firmware.

As represented in FIG. 4, the application layer 302 and the auxiliary display service layer 304 enable various structure and functionality, including auxiliary registration by which an application program 402 (or associated application plug-in) registers itself with a service registration component 404 of the auxiliary display layer 304. In the example implementation of FIG. 4, the service registration component 404 provides an IAuxAppReg interface for this purpose. Other application programs may likewise register themselves via this interface.

Once registered, the auxiliary application 402 has the ability to receive events from the associated auxiliary display device and/or related resources. For example, an event may be sent to the auxiliary application component 402 upon an auxiliary device becoming available, while another event could correspond to user interaction with the auxiliary device actuators. In the example implementation of FIG. 4, the application program implements and exposes an IAuxAppSink interface to receive such events.

The application program 402 also has the ability to enumerate the available auxiliary hardware device or devices that are available. In the example implementation of FIG. 4, a mediator component 406 in the auxiliary device service 306 provides the enumeration via an IAuxMediator interface. In this manner, the device or some data related to the device (e.g., a corresponding XML file) can report the capabilities of the device display screen or the like and/or its actuators to the application program 402. The application program 402 may then adjust the output and input according to the display, e.g., color scheme, resolution, navigation commands, and so forth can be modified for the device characteristics.

Arbitration is also provided in the mediation component 406 of the service layer via the IAuxMediator interface, to provide the mechanism that determines which application program 402 should be having its data currently displayed and should be receiving navigation commands. Note that multiple application programs take turns sharing the display as appropriate; in other words, the arbitration function of mediation manages the priority (z-order) of the auxiliary application programs and/or plug-ins.

The protocol layer 306 creates an abstraction through which the service layer 304 sends and receives data from the auxiliary device. The protocol layer 306 thus facilitates maintaining a level of hardware independence. The service layer can write to the display or set the state of indicators via an IAuxDevice interface for communicating data to the device.

Once a program is allowed to write to the display and receive commands via its actuators, auxiliary system referencing is one mechanism that provides the ability to blit/render to an abstracted memory buffer that allows the currently selected auxiliary application (e.g., plug-in) component 402 to use the display resources. In implementations that do not allow offline caching, the mediator may pass a reference pointer to the auxiliary device interface to the auxiliary application, and have the application program thereafter call the interface directly to provide display data to the display and/or indicator. This would be feasible in an offline-capable model as well. Note that there still may be such abstraction while the machine is online, even if the particular hardware implementation of the auxiliary display device does not support offline operation, e.g., the service layer would store the tree/cache, and render it to the device as bitmaps or the like using the normal online APIs, rather than the cache being stored on the device's NVRAM and rendered by the firmware. Thus, in the example implementation of FIG. 4, the application program passes its data through the service layer (the mediator interface) so that the service layer can structure the code for offline caching.

In general, in one implementation, when online, the system works like the well-known WM_PAINT model, in that an application is instructed by the service when it is the application's turn to render data, (except the data is written to the auxiliary display in this instance). In an alternative implementation, it is feasible to have the application write data to the cache instead of to the display object, e.g., using the same structure as that of the cache but rather than sending the actual data, sending a pointer to main system that is cached so that the auxiliary device obtains the data that is needed to display at the current moment via the pointer thereby avoiding data transfer and avoiding the need to regularly synchronize a cached copy of an image, for example.

As can be readily appreciated, the various layers provide auxiliary functionality in an architecture that is comprehensive and extensible. The pluggable architecture facilitates the writing of applications that can utilize the auxiliary resources without needing to understand or deal with low-level requirements.

In accordance with an aspect of the present invention, relevant application data and other information is cached for use by the auxiliary display device. A general goal is to cache the information into a quickly accessible store, along with providing a straightforward systemology for applications to provide the information to be cached. To this end, in one implementation the data is structured in a tree format (referred to as a structured cache tree), and simple primitives are provided to build the structured cache tree. In this implementation, the collection of the structured cache trees (or tree subsets), the transfer of the tree to the firmware, and the interaction by the firmware with the tree data when the main computer is powered down provides the mechanism that facilitates offline usage of an auxiliary display.

Figure 5:
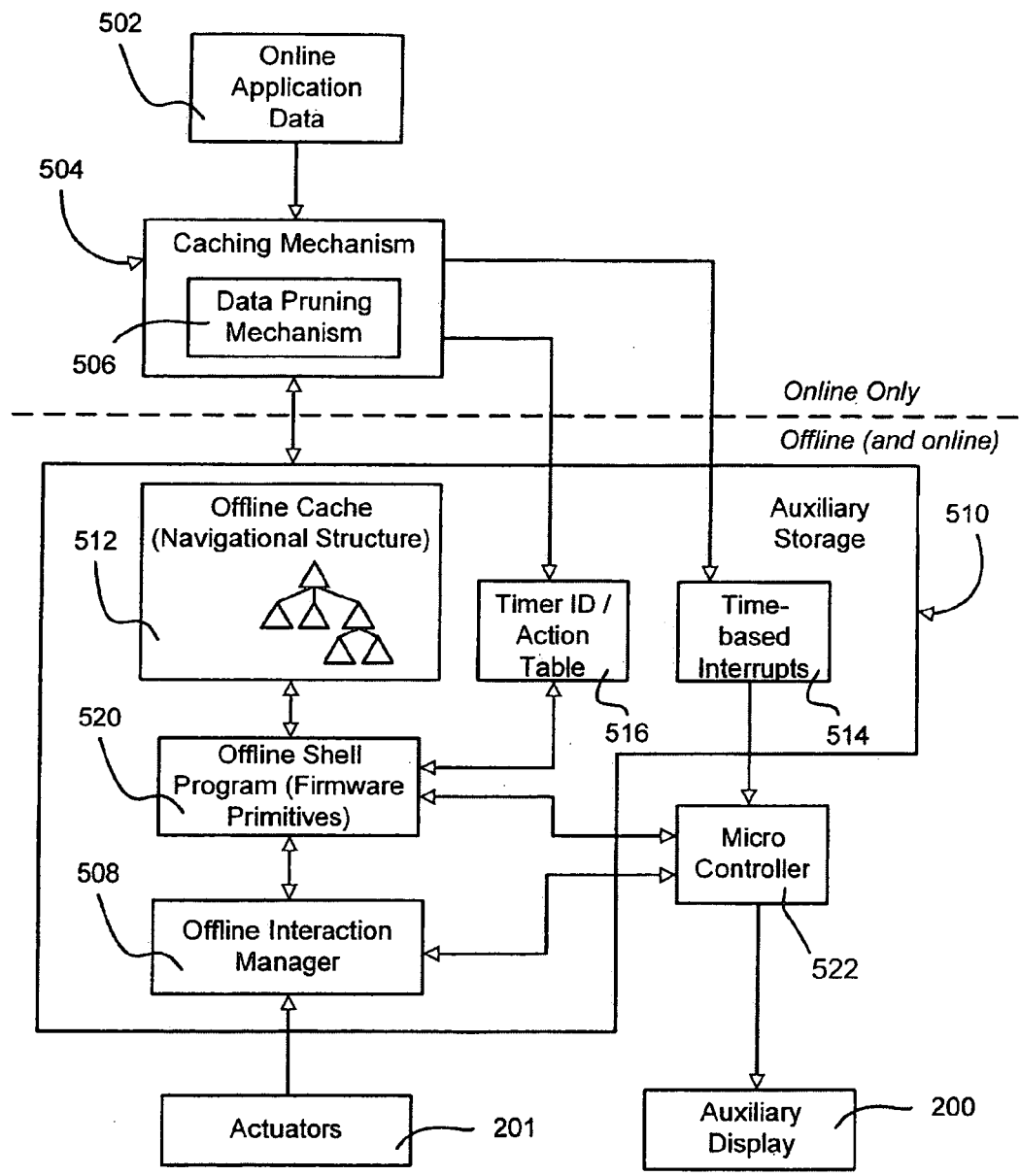
FIG. 5 is a block diagram generally representing components that provide offline navigation in accordance with an aspect of the present invention.

FIG. 5 represents a division between the online-only components and data, and the offline (firmware) components and data that can work with the online components and data when the main system is online, and also operate the auxiliary display when the main system is offline. Note that when online, the offline components and data shown in FIG. 5 are not necessarily present or active. For example, when online, an online interaction manager (not shown) handles user interaction with the actuators by sending much of the user input (e.g., navigational commands) to running application programs, whereby the offline interaction manager 508 need not be active. Also, the cache and other transferred data shown in FIG. 5 may not be transferred to the auxiliary storage 510 until transitioning from online to offline, although for speed rather than transfer all of the data, as mentioned above some of the data may be occasionally copied to auxiliary storage and synchronized at the time of online-to-offline transition time. Synchronization may be bi-directional.

As represented in FIG. 5, online application data 502 is collected by a caching mechanism 504, such as by polling each application program that uses the auxiliary display for its data; (an application that is not running but for which the user has indicated a need for offline interaction with its data can be started to obtain the data). Note that every application that uses the auxiliary display device when online may not be configured to use it when offline, or may use the auxiliary device differently when offline, such as by setting offline limits when configuring the application for offline data viewing. For example, the auxiliary display can scroll through any number of email messages when online, but the application may make no more than some default or user-configurable (e.g., twenty) messages available for offline scrolling.

The user may configure the system to control which application programs can provide data to the cache for offline viewing. For example, a user may want phone numbers, email messages, tasks and calendar data cached for offline viewing on the auxiliary display, but no other program's data. For example, even though an online application might use the auxiliary display for displaying stock quotes, a user might not want stock quotes cached for auxiliary viewing, because caching such data would waste storage space on data that rapidly would become obsolete.

The user may also configure the amount of storage that each application gets for its data and can configure the applications with rules for offline storage. Alternatively, an algorithm (described below) prunes data from the tree if the application programs provide too much data to cache, with any surplus from one application's allocation used for another applications' data when that other application's data uses more space than it has available. The redistribution of surplus data goes to applications based on a user-specified priority ordering, e.g., to the first application listed on the home page (the list order is user configurable), then if not all is needed to the next listed application, and so on.

As previously mentioned, the collection operation may take place when powering down, or may be ongoing to some extent with synchronization performed at the time of transitioning to offline. Pruning is performed as necessary by a data pruning mechanism 506 to divide the available storage up between applications and trim data as necessary for each to match the amount of space that is available. In any event, in the example implementation of FIG. 5, the result is a structured cache 508 of offline data that can be navigated via the tree structure.

Applications may want to provide more than just navigable data to users. For example, a calendar program may want to provide data such as a meeting reminder that automatically appears at a certain date and time. As it would be inefficient to walk the offline cache tree on a regular basis to look for such events, information such as to trigger a time based interrupt may be transferred to the firmware, as a list of times and actions to take (possibly via the tree, which would then have to be walked once to find it, but preferably as separate data). As represented in FIG. 5, the firmware may set up such time-based interrupts 514, and also store in a timer-ID to action table 516 or the like the action(s) to take when each identified timer interrupt occurs. In this manner, for example, specific reminders may be displayed at the correct moment, one or more indicators may light or flash, and so on.

Once set up and transferred and the main computer powered down, the microcontroller 522 and auxiliary storage take over sole control of the auxiliary display 200 and actuators 201. An offline shell program 520 may provide a home page from which navigation is based, along with the logic to process timer-based events and the like. The offline shell program 520 in conjunction with the offline interaction manager 508 handles navigation through the offline cache, as well as possibly changing the state of the display in response to non-manual actuators, e.g., to show a particular message when a battery is low. Shell primitives may include primitives for mail, phone, address, calendar, stocks, music, notes, and so on.

Figure 6:
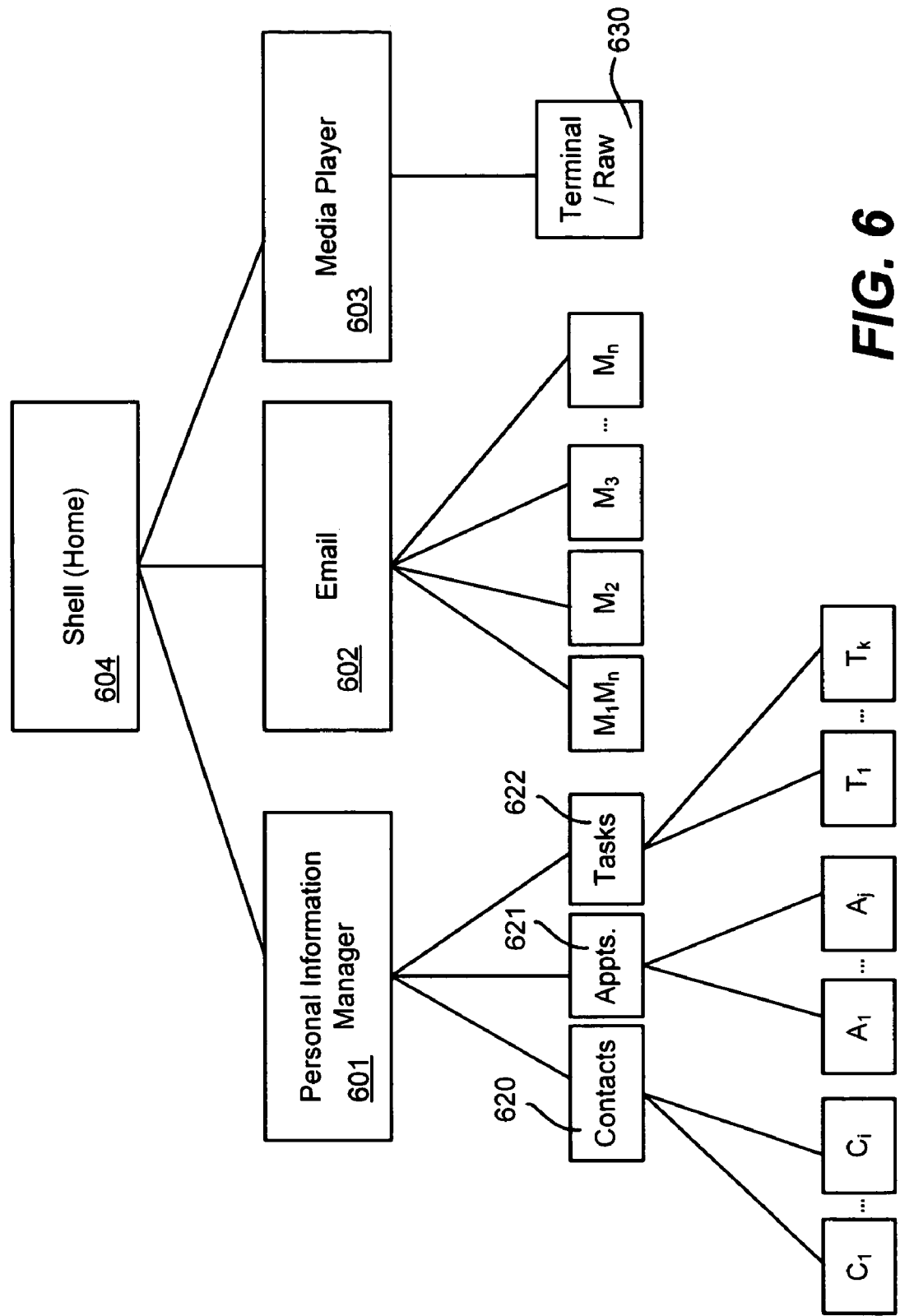
FIG. 6 is a representation of one example navigational structure, in the form of a tree for caching user data to provide offline navigation in accordance with an aspect of the present invention.

FIG. 6 shows a simple tree structure with nodes representing three application programs 601-603 under the shell (home) node 604. Although three application programs are shown any practical number (relative to the available storage space) of applications is feasible. As can be seen, because of the structure (even thought the structure itself is not typically something that would be displayed), manual navigation through the nodes is relatively intuitive and straightforward. For example, in a tree structure, only up and down navigation is needed, whereby, for example, only a two-button controller would be required, (although one or both buttons may have other functions, such as to close a timer event-driven display screen).

In general, the home page may simply provide a menu of the application programs, (scrollable if necessary) although depending on the arrangement of the actuators, a more complex menu reflecting the hierarchy is feasible, e.g., four way navigation buttons could use the up and down buttons for scrolling and the right and left buttons for expanding and collapsing the currently highlighted menu entry to show data representing any subtrees. When a user selects a page in the home page menu, such as by pressing a selection actuator button when on a page, the shell node essentially moves to that node, where the information about that page is obtained and that page is rendered. The information page may comprise anything from a bitmap to markup language (e.g., HTML or XAML) as appropriate for rendering on a given device, which depends on the code that is installed on the device. Note too that code for interpreting the cached data can be transferred or otherwise downloaded to the firmware.

As represented in FIG. 6, there may be multiple sublevels in the tree structure. For example, the personal information manager node 620 that is shown might have contacts, appointment and task nodes (620-622, respectively) beneath it, each having its own corresponding display screen and respective sub-nodes $C_1$-$C_i$, $A_1$-$A_j$ and $T_1$-$T_k$. The application program node may only have one level below it, as represented by the message nodes $M_1$-$M_n$. In general, each node corresponds to a scrollable page that displays its data and any sub-nodes to which navigation is possible.

Note that in FIG. 6 the media player application 603 is shown for completeness, to indicate that in some implementations, the same navigation tree may be used when online or offline for determining the next screen to render, even though the media application may not operate in the offline state. When online in such an implementation, an online-only media player application will have a display screen node in the tree to which the user can navigate, such as to view current track and timer data on the auxiliary display. When offline, the node (referred to as a terminal, or raw node) representing such a display screen may be pruned from the tree to save storage space. Alternatively, when a media player such as an MP3 player serves as the auxiliary display, such a node would allow the MP3 player to use the screen as desired, yet do so in the navigational framework with the other application data.

Figure 7:
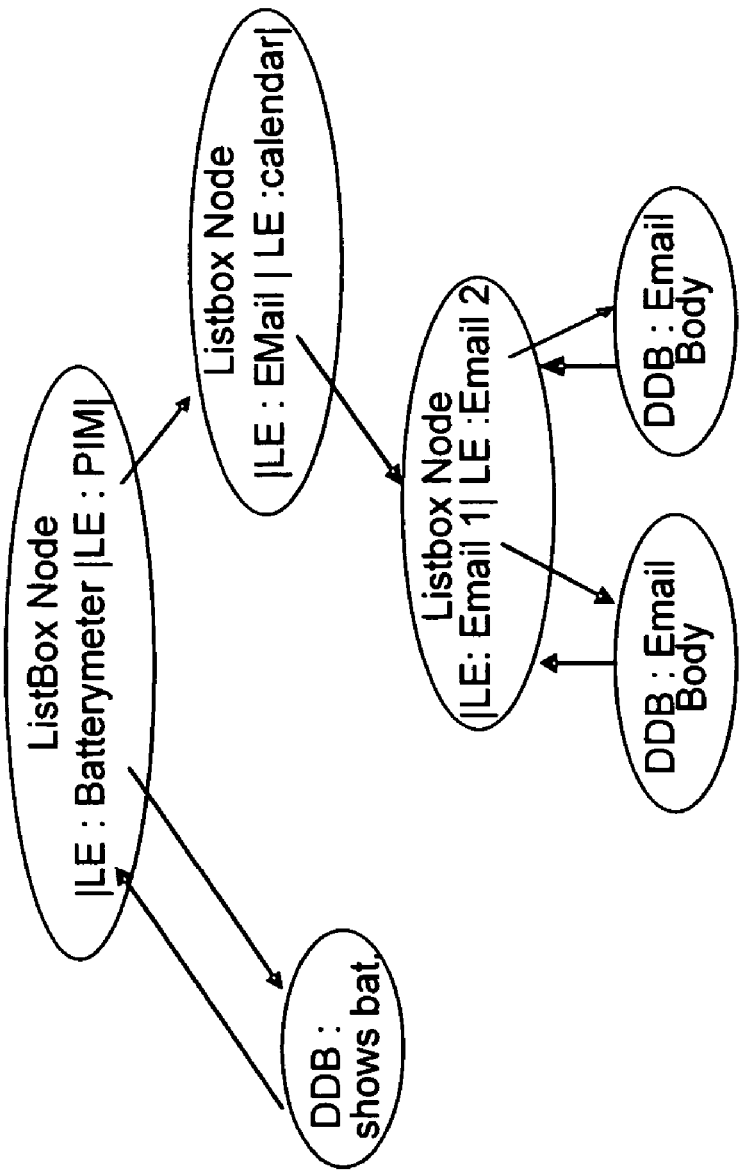
FIG. 7 is a representation of nodes of a structured cache tree, in accordance with an aspect of the present invention.

FIG. 7 shows some example data in example nodes of another tree, the data including identification labels (e.g., for showing text) of subnodes and the pointer data to those nodes. As can be seen, a battery meter page that shows the battery state can be navigated to, as can a personal information manager (PIM) page, which has email and calendar subnodes listed beneath it for navigation to via the actuators. The email node shows that if selected, two email messages are available for navigating to for display on the auxiliary display, and the body of a selected email message displayed upon navigation to that message. Note that unlike FIG. 6, in the tree of FIG. 7, the email is part of the personal information manager, however it should be understood that both FIG. 6 and FIG. 7 are only example trees.

As apparent from FIG. 7, the data that is cached is not only the application data, but also contains the structure for navigation. In this manner, the firmware can render the various images correctly as the user navigates via the actuators, whether the rendering is by providing different bitmaps from the cache in response to navigation commands, or by interpreting content by browser-like software to construct each page, or by some other mechanism. Thus, although a tree has been described, it is understood that any navigational structure (e.g., a graph, an HTML or XAML document containing rendering data or virtually any structured data) can be used for navigating among the data. In such implementations, the metadata that describes the application data is also cached. In alternative implementations, the data can be less formally structured, and the code that interprets the data can be provided to the firmware (along with the application data) if that code is not present in the firmware.

Moreover, once the navigational structure and data is cached, any auxiliary device that has access to the cache, including one not present at the time of caching, can read the data structure and allow the data to be rendered and navigated. For example, if the cache was saved to the Internet or removable media, rather than solely to a coupled device's firmware, any properly coded device with access to the cache file (and appropriate access rights) could render and navigate the data. Thus, for example, a user could read his or her cached auxiliary display data via an MP3 player as long as that player knew how to read the cache structure, even if that MP3 player was not coupled to the main computer at the time of caching. In other words, the cache is what couples the auxiliary device to the computer system. Note that this does not mean that the device understands the meaning of the data, only that it can render it and navigate it. Note further that if some of the data is itself internally structured (e.g., not a bitmap but arranged as rows and columns), rendering and navigational devices that also understand the data can do even more with the data, such as to allow suitable data to be dynamically sorted by the user as desired.

It can be readily appreciated that by preserving a cache as a file, other benefits are possible. For example, just like a file, much later (e.g., many years) the state of the auxiliary display can be replayed to recover important information.

Turning to an explanation of the pruning operation which occurs in the online state, it is possible for a sophisticated user to configure memory allotments to each application program that the user has specified as being able to use the auxiliary device when the offline state. Thus, for example, one user may have a large list of contacts that should be available, while another user has many meeting requests and still another user has a need for auxiliary display of email messages. Each user may want all of the data available, but each would prefer to give priority to a different application's corresponding display.

Lesser-sophisticated users with too much data also need a default way to divide memory among the applications' data being used to construct the tree. In one implementation, the default is to initially split the memory that is available evenly among the applications, that is, evenly to the nodes in the first level below the home page. Note that although initially split evenly, the data for any given application may not require its initial allotment, and thus the pruning mechanism may make the surplus available for the data of other applications. Thus, even if initially split evenly, there is still some mechanism needed as to how to allocate the surplus.

In one implementation, the surplus allocation mechanism is a simple priority scheme based on the order in which the home page presents the sub-pages representing the application programs. The display ordering is user configurable, and thus so is the priority.

Note that when building a tree, it is not known until a branch is built whether there is a surplus or deficit of memory for that branch. For example, an email branch may be pruned by removing messages (oldest first) until enough space is available for those messages that remain. However, the pruning of the last message, if a large message, results in what was a deficit becoming a substantial surplus that can now be redistributed to another branch of the tree. As such, the pruning algorithm is recursive from level to level and may be re-run for a branch when more memory becomes available.

The following pseudocode describes one such tree pruning routine that may be called with root identifier and total cache size variables. The total cache size (amount of memory allocated to the cache) initially is evenly divided between the branches, and each lower child node initially gets an equal share of the parent node's budget. As can be seen, pruning only applies when necessary, and the memory pruning is recursive, starting from last node to first node and up the branch. Child nodes of a branch are given any surplus first, and only if no child node can use the surplus is another branch given the surplus.

| Tree Pruning Algorithm Pseudo Code |
|---|

```
Given:
   Node                ::= A tree node.
   Node.size           ::= Total size of subtree rooted at Node.
   Node.nChildren      ::= Number of children of Node (0 if terminal).
   Node.child[0..nChildren-1]   ::= Child nodes of Node.
Prune cache tree using:
   PruneTree(Root, TotalCacheSize)
where PruneTree( ) is defined as follows:
//
// Prune tree rooted at node N to <= budget.
//
// Return amount by which pruned tree is less than budget.
//
int PruneTree(Node N, int budget) {
   // If tree is already within budget, we're done.
   if (N.size <= budget) {
      return budget – N.size;    // Return budget surplus.
   }
   // The tree is over budget and needs to be pruned.
   // If it's a terminal node (no children), then we
   // completely delete the node.
   if (N.nChildren == 0) {
      // Note: Deleting the node includes walking tree from
      // node to root, adjusting node subtree sizes
      // (i.e. subtract N.size from size of each parent to root)
      DeleteNode(N);
      return budget;   // Return full budget as surplus.
   }
   // It's an over budget tree--recursively prune the tree
   // until it is within budget.
   // childBudget is the maximum allowed size of unpruned child nodes.
   // Initially each child node is allocated an equal share of
   // the parent node's budget.
   childBudget = budget / N.nChildren;
   // Examine child nodes from last to first (we assume that
   // the most "valuable" nodes are listed first, so less
   // "valuable" nodes will be considered for pruning first.
   // Stop when parent node is within budget.
   for (i = N.nChildren – 1; i >= 0 && N.size > budget; --i) {
      // If this child is over budget, it must be
      // recursively pruned.
      if (N.child[i].size > childBudget) {
```

-continued

Tree Pruning Algorithm Pseudo Code

```
        // It will be pruned to a size that puts it within budget,
        // or puts its parent node within budget, which ever
        // requires less pruning.
        // Minimum amount this child tree must be reduced.
        minReduction = min((N.size − budget), (N.child[i].size −
childBudget));
        // Recursively prune the child tree.
        surplus = prune(N.child[i], N.child[i].size − minReduction);
    }
    else {
        // This child is within budget. It survives unpruned.
        surplus = N.child[i].size − childBudget;
    }
    // This child is now within budget by the amount given
    // by surplus.
    // If there are more children, distribute the surplus
    // evenly among them.
    if (i > 0) {
        childBudget += surplus / i;
    }
}
// Return budget surplus.
return budget − N.size;
}
```

As can be seen from the foregoing, the present invention enables application programs to cache data for displaying and navigating via an auxiliary device of a computer system when the main computer system is powered down. The present invention thus provides numerous benefits and advantages needed in contemporary computing.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computing environment having a main computer system and an auxiliary display device, a system for displaying application program data on the auxiliary display device even when the main computer system is powered off, the system comprising:

an auxiliary device service that runs on the main computer system, wherein the auxiliary device service performs a method for providing, to the auxiliary display device, first application program data corresponding to any one of a plurality of application programs that runs on the main computer system such that the auxiliary display device displays the application program data even when the main computer system is powered off, wherein the auxiliary device service comprises a layer architecture by which the plurality of application programs interface with any one of a plurality of types of auxiliary display devices, the layered architecture including an application layer, a service layer, and a protocol layer, the method comprising:

receiving, from a first application program of the plurality of application programs, a request to register the first application program with the auxiliary device service, and in response to the request, registering the first application program to display first application program data on the auxiliary display device;

upon receiving a notification that the main computer system is being powered off, the auxiliary device service prompting the first application program to provide the first application program data to be stored in a cache of the main computer system for subsequent transfer to an auxiliary storage of the auxiliary display device such that the first application program data will be accessible by the auxiliary display device even when the main computer system is powered off;

receiving the first application program data from the first application program, wherein the first application program data is received at the application layer of the layered architecture and wherein the first application program data is not structured for display on the auxiliary display device, and wherein the first application program data includes a timer based event for notifying the auxiliary display device that a portion of the first application program data should automatically be displayed on the auxiliary display device at a specified time;

generating, at the service layer, structured data by combining the first application program data with navigation information, wherein the navigation information is used to structure the first application program data in a manner that preserves context and structure information such that the first application program data may be viewed on the auxiliary display device even when the main computer system is powered off such that the auxiliary display device cannot communicate with the main computer system, and wherein the structured data is generated by the service layer independently from the first application program such that the generation of the structured data is abstracted from the first application program;

caching, in a cache stored on the main computer system, the structured data; and the service layer providing the cache to the protocol layer which transfers the structure data stored on the main computer system's cache to the auxiliary storage of the auxiliary display device such that the auxiliary storage stores the structure data and such that the auxiliary display device may access and display the first application program data even when the main computer system is powered off such that the auxiliary display device cannot communicate with the main computer system, wherein the transfer of the structure data is abstracted from the service layer such that the service layer need not be aware of underlying requirements for transferring the structure data to the auxiliary display device; and wherein the auxiliary display device performs a method for presenting the structured data corresponding to the first application program, the method comprising:

receiving, at the specified time, a notification of the timer based event while the main computer system is powered off such that the auxiliary display device cannot communicate with the main computer system to access the cache on the main computer system or the first application program corresponding to the structured data;

in response to the notification of the timer based event, accessing the structured data only from the auxiliary storage of the auxiliary display device to present the portion of the first application program data on the auxiliary display device; and displaying the portion of the first application program data automatically without user input on the auxiliary display device by rendering the structured data, wherein the structured data which corresponds to any one of the plurality of application programs is being rendered and displayed by a common application program which is different from the plurality of application programs.

2. The system of claim 1 wherein the cache on the main computer system contains a reference to the first application program data in a main memory of the main computer system, and wherein the auxiliary display device presents at least some of the first application program data by obtaining the first application program data via the reference when the main computer system is powered on.

3. The system of claim 1 wherein the structured data stored in the auxiliary storage is accessed via a shell program.

4. The system of claim 1 wherein the structured data is structured as a tree.

5. The system of claim 4 wherein the structured data stored in the auxiliary storage is accessed via a shell program and wherein the shell program presents a home page corresponding to a root of the tree.

6. The system of claim 1 wherein the auxiliary device service wherein the auxiliary device service determines whether to reduce the amount of the first application program data received for caching based on available storage space in the auxiliary storage.

7. The system of claim 1 wherein the auxiliary display device is physically connected to a housing of the main computer system.

8. The system of claim 1 wherein the auxiliary display device is remotely coupled to the main computer system.

9. The system of claim 8 wherein the auxiliary storage is physically separate from the main computer system, and wherein the auxiliary display device is remotely coupled to the main computer system via access to the structured data stored on the auxiliary storage.

10. The system of claim 1 wherein the structured data stored on the auxiliary storage contains at least one bitmap for presenting on the auxiliary display device.

11. The system of claim 1 wherein the structured data comprises data that when interpreted creates an image for rendering on the auxiliary display device.

12. In a computing environment having a main computer system including an auxiliary display device, a method for displaying application program data on the auxiliary display device even when the main computer system is powered off, wherein the application program data to be displayed is provided by any one of a plurality of application programs that run on the main computer system to a layered architecture that interface the plurality of application programs with any one of a plurality of types of auxiliary display devices, the layered architecture including an application layer, a service layer, and a protocol layer, the method comprising:

running an auxiliary device service on the main computer system, wherein the auxiliary device service provides, to the auxiliary display device, the application program data corresponding to any one of the plurality of application programs that runs on the main computer system such that the auxiliary display device displays the application program data even when the main computer system is powered off, wherein the auxiliary device service comprises the layer architecture by which the plurality of application programs interface with any one of the plurality of types of the auxiliary display devices;

receiving, from at least one application program that runs on the main computer system, a request to register the at least one application program with the auxiliary device service that runs on the main computer system, and in response to the request, registering the at least one application program to display the application program data on the auxiliary display device;

upon receiving a notification that the main computer system is being powered off, the auxiliary device service prompting the at least one application program to provide application program data to be stored in a cache of the main computer system for subsequent transfer to an auxiliary storage of the auxiliary display device such that the application program data will be accessible by the auxiliary display device even when the main computer system is powered off;

receiving the application program data from the at least one application program, wherein the application program data is received at the application layer of the layered architecture and wherein the application program data is not structured for display on the auxiliary display device, and wherein the application program data includes a timer based event for notifying the auxiliary display device that a portion of the application program data should automatically be displayed on the auxiliary display device at a specified time;

generating, at the service layer, structured data by combining the application program data with navigation information, wherein the navigation information is used to structure the application program data in a manner that preserves context and structure information such that the application program data may be viewed on the auxiliary display device even when the main computer system is powered off such that the auxiliary display device cannot communicate with the main computer system, and wherein the structured data is generated by the service layer independently from the at least one application program that provided the application program data such that the generation of the structured data is abstracted from the at least one application program;

caching, in the cache stored on the main computer system, the structured data;

the service layer providing the structured data to the protocol layer which transfers the structured data to the auxiliary storage of the auxiliary display device such that the auxiliary storage stores the structured data and such that the auxiliary display device may access and display the application program data even when the main computer system is powered off such that the auxiliary display device cannot communicate with the main computer system, wherein the transfer of the structured data is abstracted from the service layer such that the service layer need not be aware of underlying requirements for transferring the structured data to the auxiliary display device;

receiving, at the specified time, a notification of the timer based event at the auxiliary display device while the main computer system is powered off such that the auxiliary display device cannot communicate with the main computer system to access the cache on the main computer system or the at least one application program corresponding to the structured data;

in response to the notification of the timer based event, accessing the structured data only from the auxiliary storage of the auxiliary display device to present the portion of the application program data on the auxiliary display device; and displaying the portion of the application program data automatically without user input on the auxiliary display device by rendering the structured data such that context and structure of the portion of the application program data is maintained, wherein the structured data which corresponds to any one of the plurality of application programs is being rendered and displayed by a common application program which is different from the plurality of application programs.

13. The method of claim 12 further comprising receiving a navigation command at the auxiliary display device; and
determining what output data to present on the auxiliary display device based on the navigation command.

14. The method of claim 12 wherein transferring the structured data to the auxiliary storage comprises transferring the structured data to the auxiliary storage prior to powering off the main computer system.

15. The method of claim 12 wherein the auxiliary storage is a storage medium that is physically separate from the main computer system.

16. The method of claim 15 wherein accessing the structured data in the auxiliary storage comprises reading the application program data via the auxiliary display device from the auxiliary storage, wherein the auxiliary storage is not coupled to the auxiliary display device at the time of reading the application program data from the auxiliary storage.

17. The method of claim 12 further comprising accessing the structured data stored on the auxiliary storage via a shell program running in auxiliary firmware.

18. The method of claim 12 wherein combining the application program data with the navigation information comprises representing the application program data in a tree structure.

19. The method of claim 18 further comprising outputting a home page from a shell program running in auxiliary firmware, the home page providing a navigation path to at least some of the application program data stored on the auxiliary storage.

20. The method of claim 12 further comprising reducing the amount of the received application program data based on available storage space in the auxiliary storage.

21. The method of claim 12 further comprising, determining that the time based event corresponds to a particular action that requires accessing the structured data stored on the auxiliary storage.

22. A computer-readable storage medium having stored computer-executable instructions which when executed perform the method of claim 12.

23. The method of claim 12 wherein rendering comprises displaying bitmaps that are stored in the auxiliary storage.

24. The method of claim 12 wherein rendering comprises constructing the display from at least one of an HTML document and an XAML document.

* * * * *